(12) United States Patent
Goodall et al.

(10) Patent No.: US 11,354,575 B1
(45) Date of Patent: Jun. 7, 2022

(54) CALIBRATED SENSITIVITY MODEL APPROXIMATING THE EYE

(71) Applicant: Facebook Technologies, LLC, Menlo Park, CA (US)

(72) Inventors: Todd Goodall, Mill Valley, CA (US); Anjul Patney, Kirkland, WA (US); Trisha Lian, Redmond, WA (US); Romain Bachy, Seattle, WA (US); Gizem Rufo, Seattle, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/993,793

(22) Filed: Aug. 14, 2020

(51) Int. Cl.
*G06N 3/08* (2006.01)
*G06T 7/90* (2017.01)
*G06K 9/62* (2022.01)
*G06T 3/00* (2006.01)
*G06N 3/04* (2006.01)

(52) U.S. Cl.
CPC ............ *G06N 3/08* (2013.01); *G06K 9/6262* (2013.01); *G06N 3/04* (2013.01); *G06T 3/005* (2013.01); *G06T 3/0093* (2013.01); *G06T 7/90* (2017.01); *G06T 2207/10016* (2013.01); *G06T 2207/20081* (2013.01)

(58) Field of Classification Search
CPC combination set(s) only.
See application file for complete search history.

(56) References Cited

U.S. PATENT DOCUMENTS

| | | | |
|---|---|---|---|
| 2016/0161740 A1* | 6/2016 | Bar-Zeev | G06T 19/006 345/633 |
| 2018/0205955 A1* | 7/2018 | Bona | H04N 19/15 |
| 2019/0108447 A1* | 4/2019 | Kounavis | G06K 9/00355 |
| 2020/0097754 A1* | 3/2020 | Tawari | G06K 9/00791 |

OTHER PUBLICATIONS

Xian-Shi Zhang,"A Retina Inspired Model for Enhancing Visibility of Hazy Images," Dec. 22, 2015, Frontiers in Computational Neuroscience, pp. 1-10.*

(Continued)

*Primary Examiner* — Omar S Ismail
(74) *Attorney, Agent, or Firm* — Baker Botts L.L.P.

(57) ABSTRACT

In one embodiment, a method includes projecting a source image onto a surface using a lens approximation component, where the surface is associated with sampling points approximating photoreceptors of an eye, where each sampling point has a corresponding photoreceptor type, sampling color information from the projected source image at the sampling points, where the color information sampled at each sampling point depends on the corresponding photoreceptor type, accessing pooling units approximating retinal ganglion cells (RGCs) of the eye, where each pooling unit is associated with groups of one or more of the sampling points, calculating weighted aggregations of the sampled color information associated with the groups of one or more sampling points associated with each pooling unit, and computing a perception profile for the source image based on the weighted aggregations associated with each of the pooling units.

20 Claims, 10 Drawing Sheets

(56) References Cited

OTHER PUBLICATIONS

Greg Field, "Spatial Properties and Functional Organization of Small Bistratified Ganglion Cells in Primate Retina," Oct. 20, 2007,The Journal of Neuroscience, Nov. 28, 2007 • 27(48):,pp. 13261-13270.*

Andrew B. Watson,"A formula for human retinal ganglion cell receptive field density as a function of visual field location",Jun. 30, 2014,Journal of Vision (2014) 14(7):15, 1-17,pp. 1-11.*

Tim Gollisch, Features and functions of nonlinear spatial integration by retinal ganglion cells,Available online Dec. 20, 2012,Journal of Physiology—Paris 107 (2013) 338-348,SciVerse ScienceDirect,pp. 338-346.*

Michele Rucci,"Temporal CodingofVisualSpace",Available online Sep. 25, 2018,Trends inCognitiveSciences,Oct. 2018,vol. 22,No. 10, pp. 883-892.*

Isetbio, Wiki, GitHub, https://github.com/isetbio/isetbio/wiki, 4 pages.

Curcio, et al., Human photoreceptor topography, Journal of comparative neurology, vol. 292, No. 4, pp. 497-523, 1990.

Dacey, et al., Dendritic field size and morphology of midget and parasol ganglion cells of the human retina, Proceedings of the National Academy of sciences, vol. 89, No. 20, pp. 9666-9670, 1992.

Watson, et al., A formula for human retinal ganglion cell receptive field density as a function of visual field location, Journal of Vision, 14(7):15, 1-17, 2014.

Cottaris, et al., A computational-observer model of spatial contrast sensitivity: Effects of wave-front-based optics, cone-mosaic structure, and inference engine, Journal of vision 19(4):8, 1-27, 2019.

* cited by examiner

CALIBRATED SENSITIVITY MODEL APPROXIMATING THE EYE

TECHNICAL FIELD

This disclosure generally relates to image processing, and in particular relates to modeling human visual sensitivity.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

SUMMARY OF PARTICULAR EMBODIMENTS

Embodiments described herein are directed to a virtual eye model, which refers to a computer-implemented bottom-up model of the human visual system. Pre-existing human visual system models, e.g., Image System Engineering Toolbox for Biology (ISETBio) [1][2], mimic early to later stages of human vision and characterize how the visual system converts light into neural signals. ISETBio, for example, has the goal of modeling every functional detail of the eye, including models of physiological optics, inert ocular pigments, eye movements, photoreceptor sampling (cone mosaic) and photopigment absorptions, and cone photocurrent [1]. However, the biological accuracy achieved by such pre-existing models comes at the expense of high computational costs, which can be prohibitive or impractical for certain applications that have limited system resources or tight timing or power budgets. The virtual eye model disclosed herein differs from pre-existing models in its implementation and application. Instead of biological accuracy, the virtual eye model focuses on computational and memory efficiency, which is achieved in part by leveraging a machine learning framework and real-time and simultaneous computation of a much wider field of view. These fundamental design goals and implementation of the presently-disclosed virtual eye model enable its unique application to real-time streaming, gaze-contingent displays, and foveated rendering.

Modeling human visual sensitivity to the spatiotemporal world may be essential for predicting quality of experience when designing high-end display technologies. For example, head-mounted displays (HMDs) already provide engaging content covering a wide field of view. Emerging HMD technologies are beginning to incorporate eye-tracking, providing opportunities for visual information reduction and compression. Predicting user experience may require an accurate human visual sensitivity mode that incorporates field of view, gaze position, and spatiotemporal sensitivity. The human visual sensitivity model may be referred to as a virtual eye model. The virtual eye model may comprise a lens approximation component, a surface approximating a retina of an eye, sampling points approximating photoreceptors, and pooling units approximating retinal ganglion cells (RGCs). The virtual eye model may produce a perception profile as an output for a given source input image. To compute the perception profile for the given source image using the virtual eye model, a computing device may project a source image onto the surface using the lens approximation component. The source image can be of any resolution while a resolution of the surface may be pre-determined. The lens approximation component may comprise an Optical Transfer Function (OTF) and a warping operator. The OTF may convolve a matrix representing pixel information of the source image with convolution templates and multiply the convolved matrices with a coding matrix. The warping operator may map the image on a concave shape surface to an image on a 2-dimensional flat surface. The surface may approximate a retina of the eye in the virtual eye model. The surface may be associated with sampling points approximating photoreceptors of an eye. Each sampling point may have a corresponding photoreceptor type. A distribution of a type of the sampling points may be associated with a corresponding blue noise mask. The computing device may sample color information from the projected source image at the sampling points. The color information sampled at each sampling point may depend on the corresponding photoreceptor type. The computing device may access the pooling units approximating RGCs of the eye. Each pooling unit may have a corresponding RGC type. A distribution of a type of the pooling units may be associated with a corresponding blue noise mask. Each pooling unit may be associated with two groups of one or more of the sampling points. Each group of one or more of the sampling points associated with a pooling unit may be determined based on a field weighting function. In particular embodiments, the field weighting function may be a Gaussian receptive field function. The computing device may calculate a weighted aggregation of the sampled color information associated with each group of one or more sampling points associated with each of the pooling units. The computing device may compute a perception profile for the source image based on the weighted aggregations associated with each of the pooling units. In particular embodiments, the computing device may compute the perception profile for the source image using Rectified Linear Unit (ReLU) activation functions.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
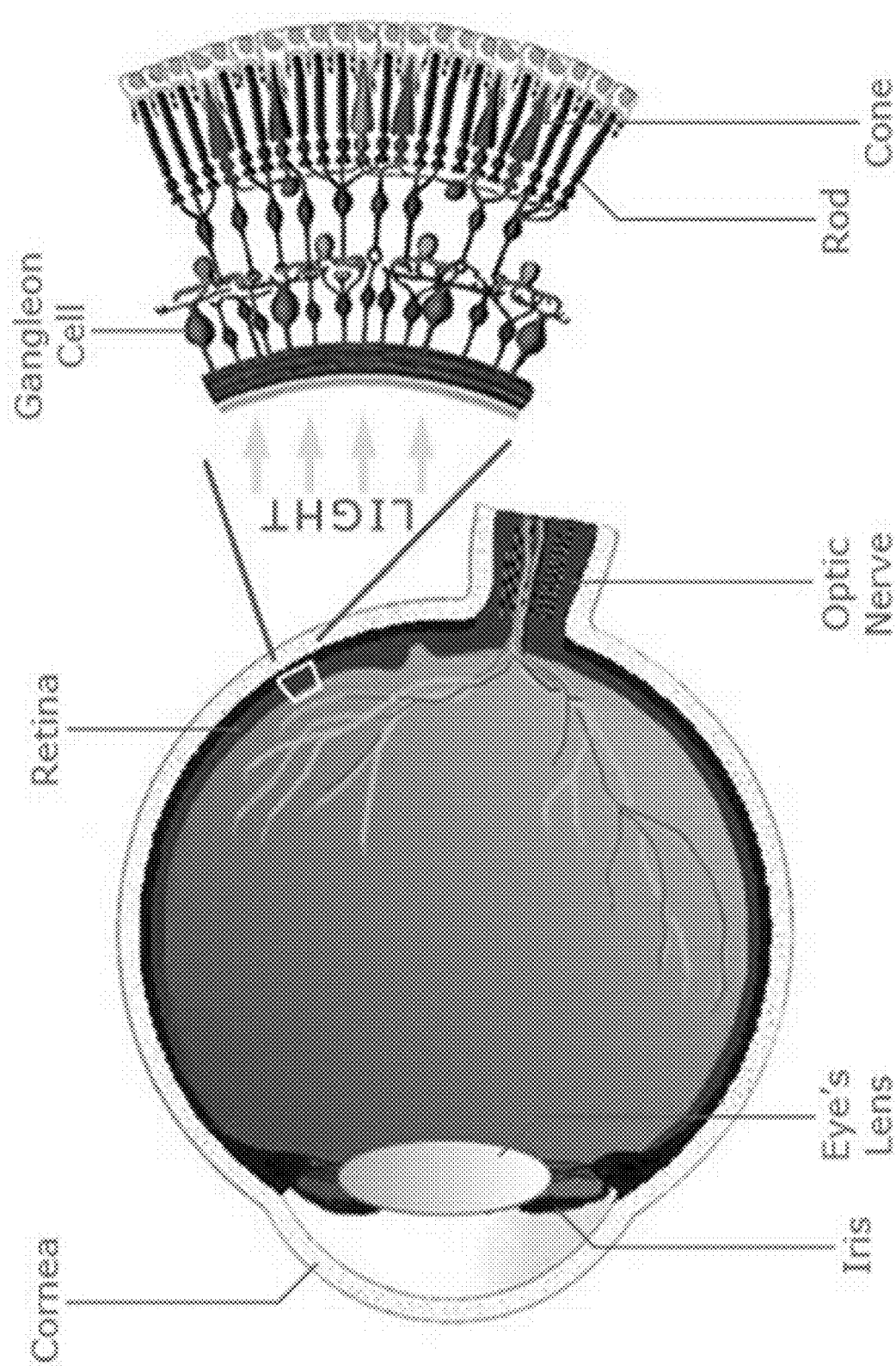
FIG. 1 illustrates an example human eye structure.

FIG. 1 illustrates an example human eye structure. Cornea is a clear dome over the iris. The cornea, with the anterior chamber and lens, refracts light. The iris is a colored part of an eye. Pupil is a circular opening in the iris that lets light in. The iris contains muscles that allow the pupil to become larger and smaller. Light that enters the eye passes through the pupil and lens before the light reaches the retina. The retina is the back part of the eye that contains the cells that respond to light. The cells are called photoreceptors. The photoreceptors comprise rods and cones. Each cone photoreceptor is most sensitive to a corresponding band of visual spectrum. A RGC is a type of neuron located near the inner surface (the ganglion cell layer) of the retina. The RGC receives visual information from photoreceptors via two intermediate neuron types: bipolar cells and retina amacrine cells. The optic nerve is located in the back of the eye. The optic nerve transfers visual information from the retina to the vision centers of the brain via electrical impulses.

Figure 2:
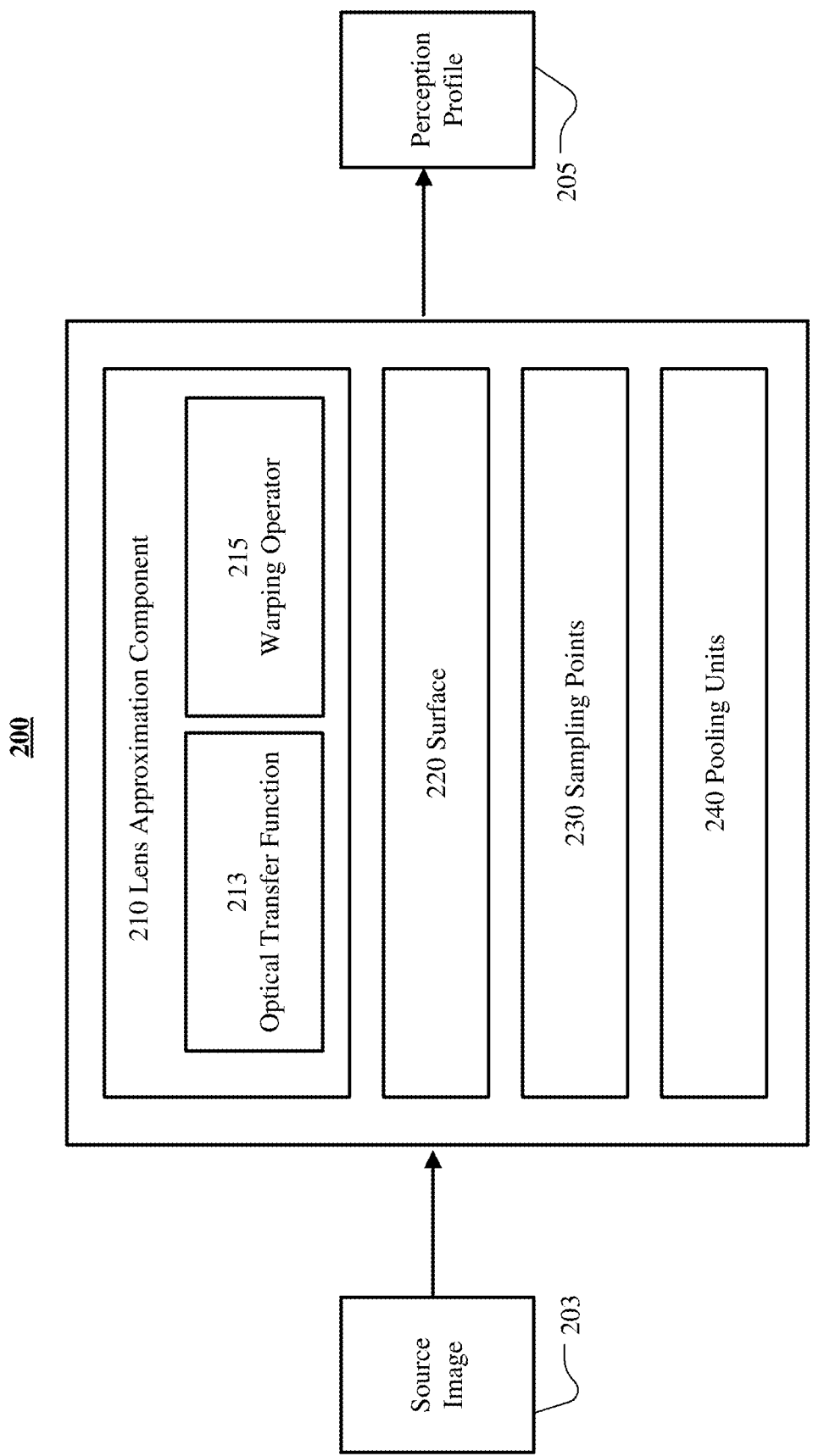
FIG. 2 illustrates an example architecture of the virtual eye model.

FIG. 2 illustrates an example architecture of the virtual eye model. The virtual eye model 200 may compute a perception profile 205 for a given source image 203. The virtual eye model 200 may comprise a lens approximation component 210, a surface 220, sampling points 230, and pooling units 240. The lens approximation component 210 may approximate a lens of a human eye. The lens approximation component 210 may comprise an optical transfer function 213 and a warping operator 215. The surface 220 may approximate a retina of the human eye. The surface 220 may be associated with the sampling points 230. The sampling points 230 may approximate cone photoreceptors of the human eye. Each sampling point 230 may have a corresponding cone photoreceptor type. The pooling units 240 may approximate RGCs of the human eye. Each pooling unit 240 may have a corresponding RGC type. Each pooling unit 240 may be associated with two groups of one or more of the sampling points. Although this disclosure describes a particular architecture of the virtual eye model, this disclosure contemplates any suitable architecture of the virtual eye model.

In particular embodiments, a computing device associated with the virtual eye model 200 may project a source image 203 onto a surface 220 using a lens approximation component 210. The source image 203 can be of any resolution while a resolution of the surface 220 may be pre-determined. In particular embodiments, the source image 203 may correspond to a frame of a video stream. The lens approximation component 210 may comprise an OTF 213 and a warping operator 215. The OTF 213 may convolve a matrix representing pixel information of the source image 203 with convolution templates and multiplies with a coding matrix. In particular embodiments, the computing device may obtain the convolution templates and the coding matrix by a matrix factorization. The output of the OPT may be an image on a concave shape retina surface of the human eye. The warping operator 215 may map the image on the concave shape surface to an image in a 2-dimensional flat surface 220. The surface 220 may approximate a retina of the human eye. The surface 220 may be associated with sampling points 230 approximating photoreceptors of the human eye. Each sampling point 230 may have a corresponding photoreceptor type. A distribution of a type of the sampling points 230 may be associated with a corresponding blue noise mask. The computing device may sample color information from the projected source image at the sampling points 230. The color information sampled at each sampling point 230 may depend on the corresponding photoreceptor type. The computing device may access pooling units 240 approximating RGCs of the human eye. In particular embodiments, a pooling unit 240 may approximate an RGC of the human eye. In particular embodiments, a pooling unit 240 may approximate a group of RGCs of the human eye. Each pooling unit 240 may have a corresponding RGC type. A distribution of a type of the pooling units 240 may be associated with a corresponding blue noise mask. Each pooling unit 240 may be associated with two groups of one or more of the sampling points 230. Each group of one or more of the sampling points 230 associated with a pooling unit 240 may be determined based on a field weighting function. In particular embodiments, the field weighting function may be a Gaussian receptive field function. The computing device may calculate a weighted aggregation of the sampled color information associated with each group of one or more sampling points 230 associated with each of the pooling units 240. The computing device may compute a perception profile 205 for the source image 203 based on the weighted aggregations associated with each of the pooling units 240. In particular embodiments, the computing device may compute the perception profile 205 for the source image 203 using ReLU activation functions. The perception profile 205 for the source image 203 may approximate spatiotemporal signal sent from the RGCs through optic nerve. Although this disclosure describes computing a perception profile for a source image using a virtual eye model in a particular manner, this disclosure contemplates computing a perception profile for a source image using a virtual eye model in any suitable manner.

In particular embodiments, the source image can be of any resolution while a resolution of the surface may be pre-determined. In particular embodiments, the source image may correspond to a frame of a video stream. As an example and not by way of limitation, the computing device may process a video stream using the virtual eye model 200. A source image 203 may correspond to a frame of the video stream. The virtual eye model 200 may produce a perception profile 205 for each of the source images corresponding to the frames of the video stream, where a perception profile 205 for a source images approximates spatiotemporal vision signals from RGCs. As the lens approximation component 210 may project any size image onto the fixed size surface 220, the virtual eye model may be able to process video streams of any resolution.

Figure 3:
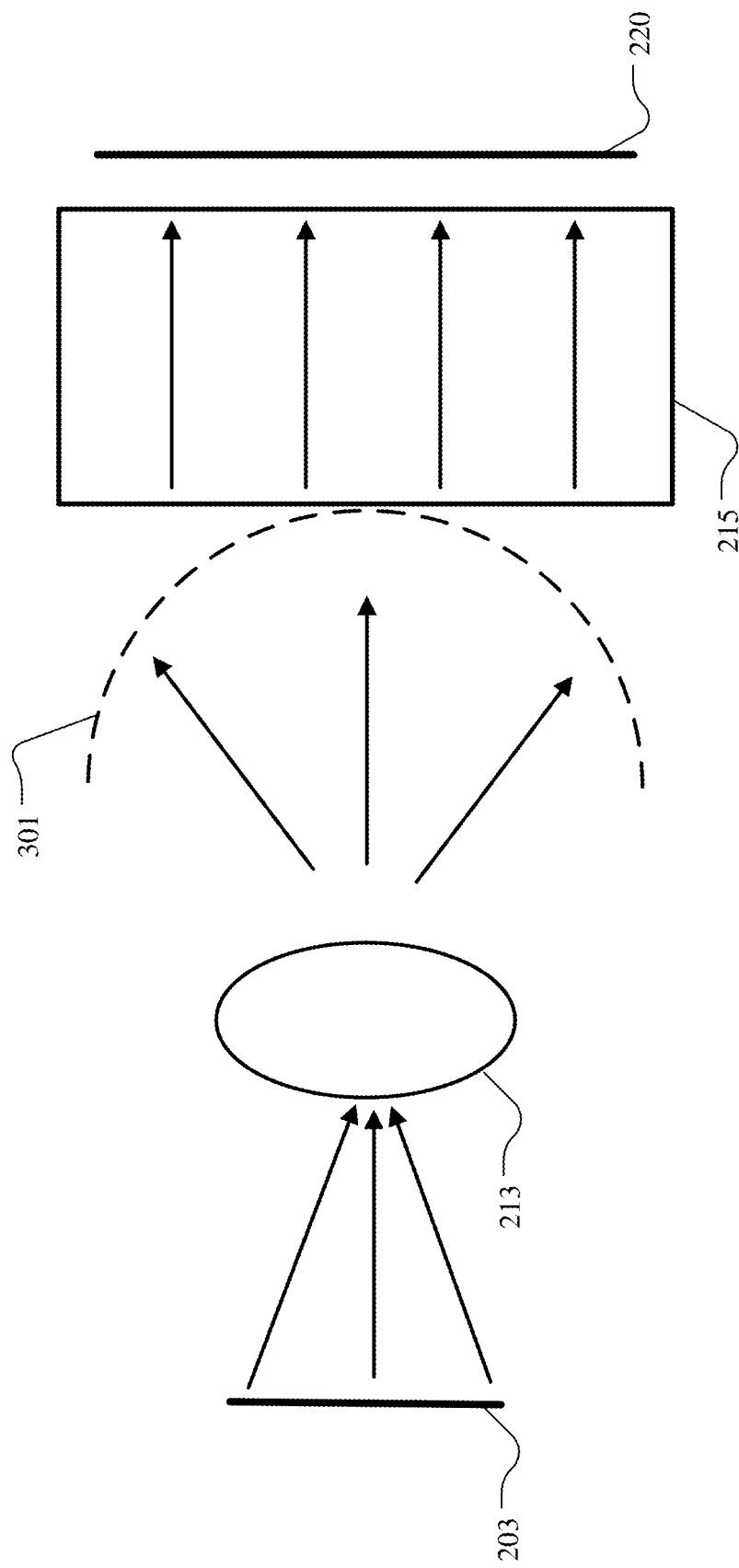
FIG. 3 illustrates an example image projection by a lens approximation component.

In particular embodiments, the computing device may project a source image 203 onto the surface 220 using the lens approximation component 210 of the virtual eye model 200. Light that enters the eye may pass through the pupil and lens before the light reaches the retina. The pupil and lens may control the amount of incoming light as well as the scatter, which may vary with wavelength. The pupil and lens may form an adaptive system. Pupil size may be well characterized as a function of incoming light. In particular embodiments, a fixed pupil size may be assumed for the virtual eye model 200 to simplify the virtual eye model 200. For example, 4 mm may be an average size of a pupil size for typical indoor viewing conditions. The lens approximation component 210 may comprise an Optical Transfer Function (OTF) 213 and a warping operator 215. FIG. 3 illustrates an example image projection by a lens approximation component. In the example illustrated in FIG. 3, the OTF 213 may project the source image 203 onto a curved shape retina surface 301. The warping operator 215 may map the image projected onto the curved shape surface 301 into an image on a two-dimensional surface 220. Although this disclosure describes projecting a source image onto a surface using a lens approximation component in a particular manner, this disclosure contemplates projecting a source image onto a surface using a lens approximation component in any suitable manner.

In particular embodiments, The OTF 213 may convolve a matrix representing pixel information of the source image with convolution templates and multiply the convolved matrices with a coding matrix. In particular embodiments, the computing device may obtain the convolution templates and the coding matrix by a matrix factorization. The output of the OTF 213 may be an image on a concave shape surface 301 of a retina of the eye. In particular embodiments, the warping operator 215 may map the image on the concave shape surface 301 to an image on a 2-dimensional flat surface 220. The surface 220 may approximate a retina of the eye. The following formula may be used to compute a full convolution response R of a filter $F_{i,j}$ defined per location (i, j) of the source image 203 when the filter size is (2K+1; 2K+1):

$$R(i, j) = \sum_{m=-K}^{K} \sum_{n=-K}^{K} F_{i,j}(i-m, j-n)I(i, j) \quad (1)$$

which requires $2 \times (2K+1)^2$ floating point operations per point (i, j). For M×N image inputs, the complexity of this approach may be $O(2MN(2K+1)^2)$, since the optimized convolution algorithms like an FFT may not be utilized. When each individual $F_{i,j}$ exhibits a high degree of similarity, as is the case with point spread functions and the scales of Gaussian functions used in retinal modeling, the dictionary of $F_{i,j}$ may be decomposed into a representative set of basis functions. In other words, a coding matrix C and basis X may be computed for a given set of F, such that $\|F-CX\|_2^2$ is minimized. When reconstruction quality is within acceptable limits (i.e. the fewest number of basis functions are selected that yield acceptable quality are found), then equation 1 may provide a path to applying an FFT by convolving I by X then weighting by the code that reconstructs the appropriate response at each (i, j). The complexity of such approach may be O(2MN log(MN)+MN), which may be much lower in complexity for larger K. To compute the basis X for varying width Gaussian kernels and point spread functions, a non-negativity constraint should be applied to avoid negative values in the reconstruction, which can greatly impact model performance. The OTF 210 may employ a Non-negative Matrix Factorization (NMF) solver to satisfy the non-negativity constraint. Although this disclosure describes projecting a source image onto a surface by the lens approximation component in a particular manner, this disclosure contemplates projecting a source image onto a surface by the lens approximation component in any suitable manner.

Figure 4:
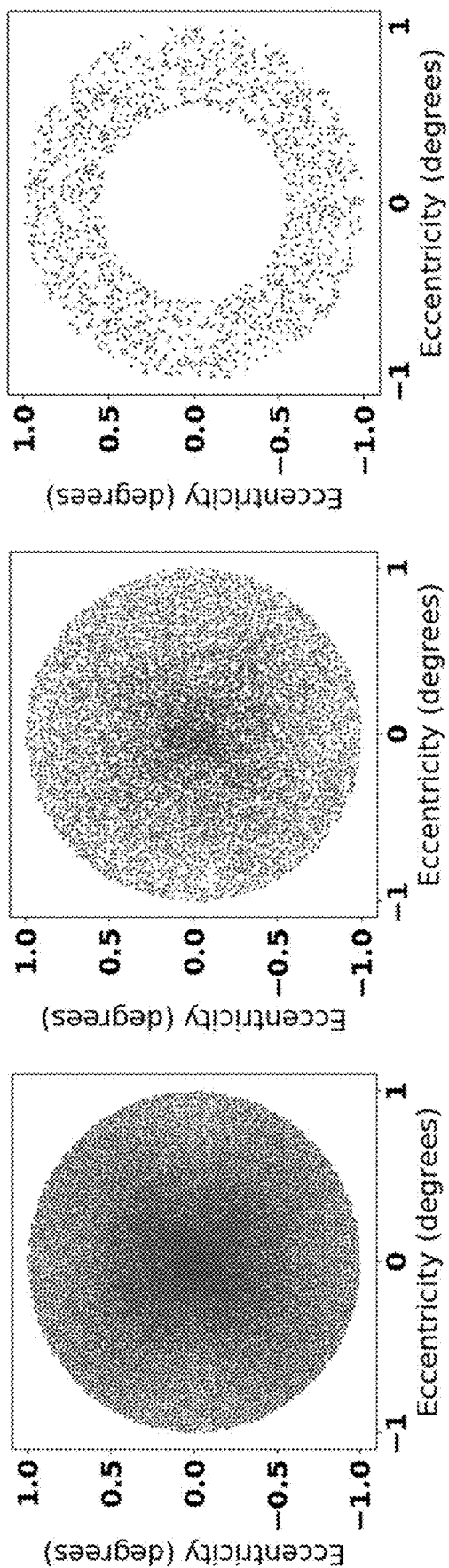
FIG. 4 illustrates example distributions of cone photoreceptors.

In particular embodiments, the surface 220 may be associated with sampling points 230 that approximate cone photoreceptors of a human eye. Each sampling point may have a corresponding photoreceptor type. Cone photoreceptor types may comprise L cones, M cones, and S cones. L cones respond to light of longer wavelengths, peaking at about 560 nm. M cones respond to light of medium-wavelength, peaking at 530 nm. S cones respond to short-wavelength light, peaking at 420 nm. A distribution of a type of the sampling points 230 may be associated with a corresponding blue noise mask. Blue noise samples that have been shown to match the retinal cone distributions may be used to determine locations of the sampling points 230. In particular embodiments, the density of cone photoreceptors measured in [3] may be used to model eccentricity. FIG. 4 illustrates example distributions of cone photoreceptors. (a) illustrates a distribution of L cones. (b) illustrates a distributions of M cones. (c) illustrates a distributions of S cones. The center of the human retina may not contain S cones. In particular embodiments, the void-and-cluster algorithm may be used for generating progressive two-dimensional blue noise texture. Sampling masks corresponding to L, M, S cones may form mosaics for the L, M, and S cones respectively. The resulting noise texture may be tiled to span the field of view. In particular embodiments, hexagonal sampling may be used for generating progressive two-dimensional blue noise texture. Although this disclosure describes determining locations for sampling points in a particular manner, this disclosure contemplates determining locations for sampling points in any suitable manner.

In particular embodiments, the computing device may sample color information from the projected source image at the sampling points 230. The color information sampled at each sampling point 230 may depend on the corresponding photoreceptor type. A sampling point 230 corresponding to L cone may be associated with red color information. A sampling point 230 corresponding to M cone may be associated with green color information. A sampling point 230 corresponding to S cone may be associated with blue color information. In particular embodiments, a bilinear interpolation may be used. Each sampling point 230 may be considered to cover equal amount of area. Although this disclosure describes sampling color information at the sampling points in a particular manner, this disclosure contemplates sampling color information at the sampling points in any suitable manner.

Figure 5:
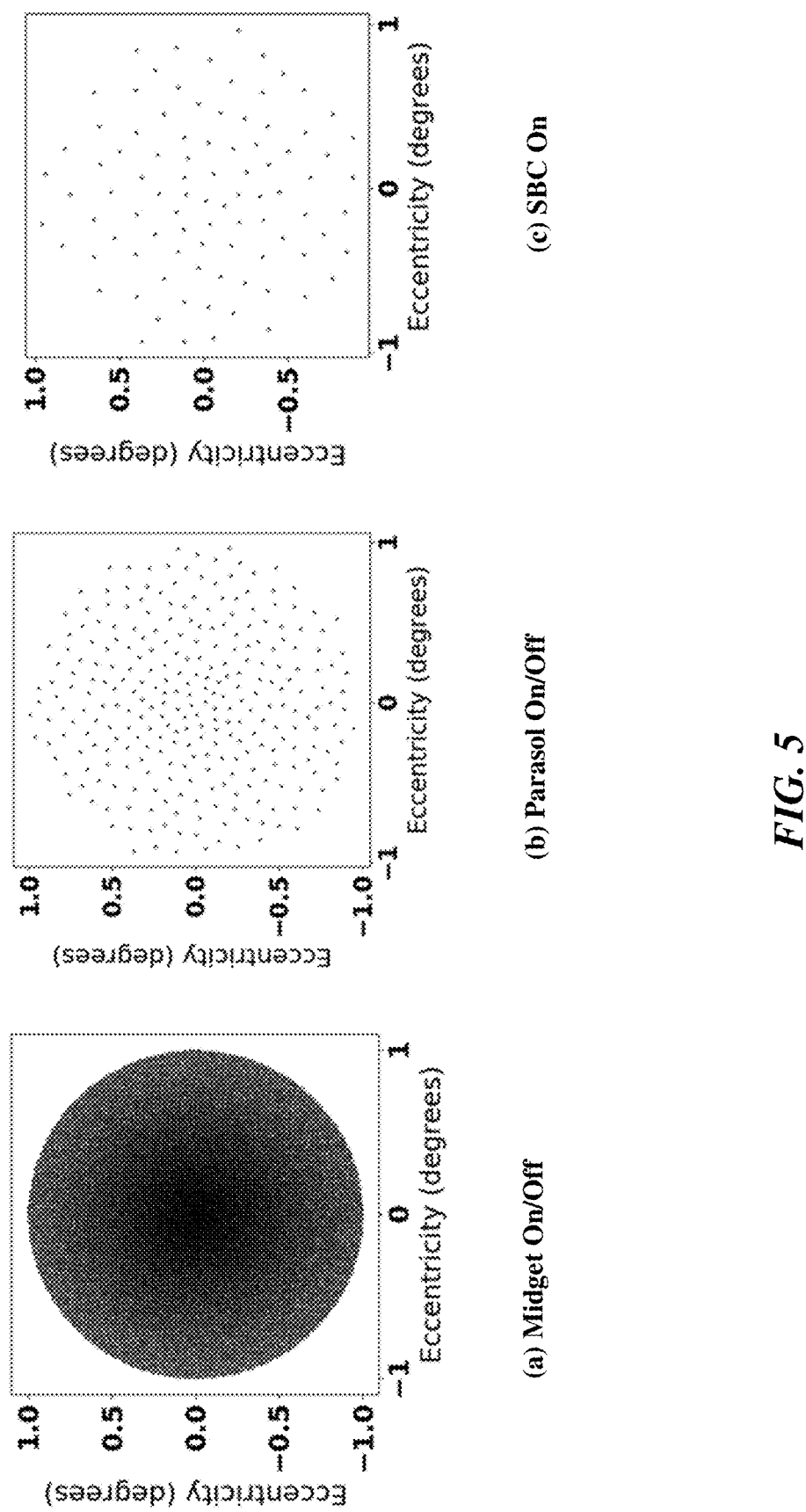
FIG. 5 illustrates example distributions for RGC types.

In particular embodiments, the computing device may access pooling units 240 that approximate RGCs of the human eye. Each pooling unit 240 may have a corresponding RGC type. RGC types may comprise Midget, Parasol, and Small Bistratified Cell (SBC). A pooling unit 240 corresponding to the Midget cell may be further classified between Midget-On and Midget-Off. A pooling unit 240 corresponding to the Parasol cell may be further classified between Parasol-On and Parasol-Off. A pooling unit 240 corresponding to the SBC may be classified as SBC-On. A distribution of a type of the pooling units 240 is associated with a corresponding blue noise mask. In particular embodiments, Midget cell distribution estimated by [4] may be used for the blue noise mask for pooling units 240 corresponding to Midget cells. Parasol cell distribution estimated by [5] may be used for the blue noise mask for pooling units 240 corresponding to Parasol cells. SBC distribution may be assumed to be identical to the distribution of Parasol-On. FIG. 5 illustrates example distributions for RGC types. (a) illustrates an estimated distribution of Midget cells. A ratio between Midget-On and Midget-Off may be 1:2. (b) illustrates an estimated distribution of Parasol cells. A ratio between Parasol-On and Parasol-Off may be 1:2. (c) illustrates an estimated distribution of SBC. Although this disclosure describes determining a location of a pooling unit in a particular manner, this disclosure contemplates a location of a pooling unit in any suitable manner.

Figure 6:
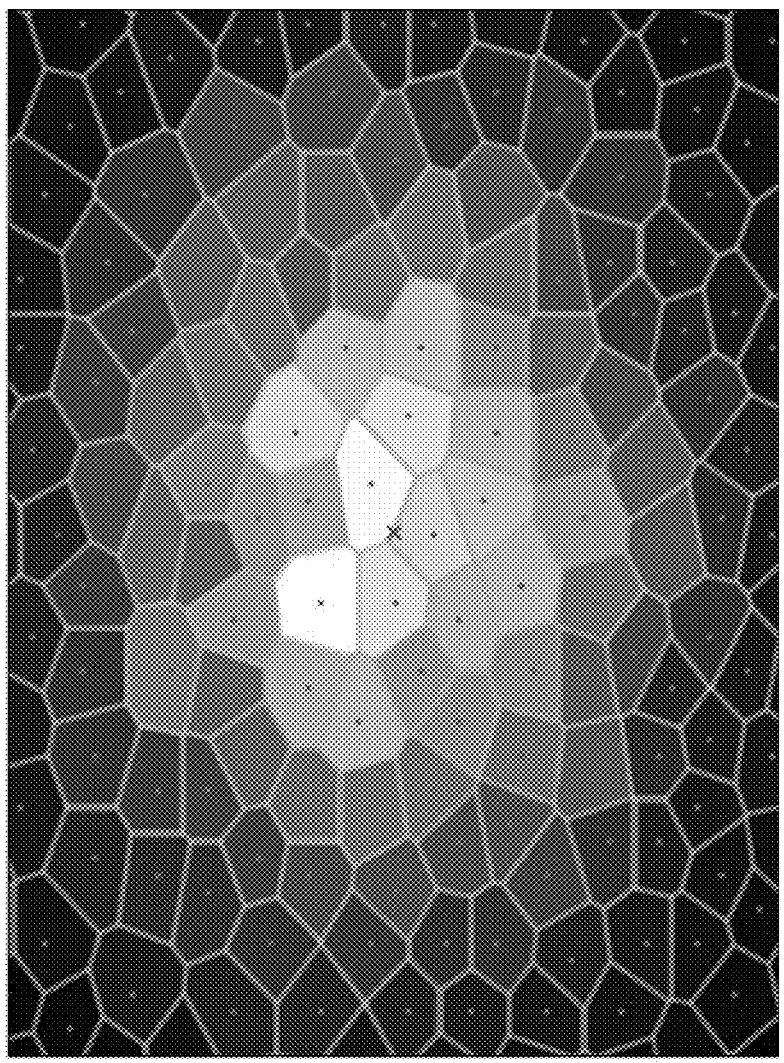
FIG. 6 illustrates an example grouping of sampling points for a pooling unit based on a field weighting function.

In particular embodiments, each pooling unit 240 may be associated with two groups of one or more of the sampling points 230. In the retina of the human eye, signals processed by cone cells are transmitted through both horizontal and bipolar cells, which encode over space and time. RGCs encode the output of bipolar cells into noisy spike trains that get delivered down the optic nerve. Midget cells may have a one-to-one connectivity between cones and the Midget cells in the center of the fovea, and a one-to-many connectivity in peripheral vision. Horizontal cells, which aggregate cone responses spatially, form a surround receptive field, which is subtracted from the bipolar centralized receptive field. Midget cells may be further classified between Midget-On and Midget-Off. Midget-On cells form responses from only L and M cones, with surround suppressing the center response. Midget-Off cells form responses from each cone type, but with center suppressing the positive surround response. Since a functional nonlinearity thresholds output values less than 0, Midget-On and Midget-Off cells encode the complete contrast encoding for both increments and decrements. For Parasol cells, transient bipolar cells accumulate surround information from multiple horizontal cells, to accumulate information over larger spatial areas. Parasol cells may be further classified between Parasol-On and Parasol-Off. Parasol-On cells form responses from only L and M cones, with surround suppressing the center response. Parasol-Off cells form responses from only L and M cones, but with center suppressing the positive surround response. SBC exist as only SBC-On cells. SBC-On cells borrow the surround receptive field from Parasol-On cells. The center receptive field of SBC-On is formed from only blue cones. For each pooling unit 240, a first group of one or more of the sampling points 230 may approximate the center receptive field and a second group of one or more of the sampling points 230 may approximate the surround receptive field. In order to model each receptive field for a type of pooling units 240, a field weighting function may be used. Each group of one or more of the sampling points 230 associated with a pooling unit 240 may be determined based on a field weighting function. Given the random arrangement of cone locations, RGCs may be considered to be randomly wired to cone cells. A field weighting function may be used to randomly select and weight sampling points 230 for a pooling unit 240. Voronoi clustering may be used to represent the volume that each sampling point 230 represents. A field weighting function may be used to apply connectivity weights. In particular embodiments, the field weighting function may be a Gaussian receptive field function. In particular embodiments, the computing device may calculate a weighted aggregation of the sampled color information associated with each group of one or more sampling points 230 associated with each of the pooling units 240. Gaussian weighted receptive fields may weight pixels according to the Gaussian probability density function. Sampling the density function may result the same as computing the Gaussian density at the centroid of a polygon and multiplying by polygonal area. As the size of the polygon decreases, the representation approaches the definition of the Gaussian density. A weighted aggregation of the sampled color information associated with a group of one or more sampling points 230 associated with a pooling unit 240 is defined as:

$$RGC(m, S(i)) = \sum_{x \in sampling\ point\ set} sampling\ point_x \frac{V_x}{(2\pi)mS(i)^2} e^{-\frac{1(x-i)^2}{2mS(i)^2}}$$

where m is a scalar multiple applied to the spacing controlling spacing function $S(\theta)$, and $\theta$ is eccentricity. This function can be used to define center and surround receptive fields. In particular embodiments, the weighted aggregation of the sampled color information associated with the center receptive field may be defined using $RGC(1; S(i))$, and the weighted aggregation of the sampled color information associated with the surround receptive field may be defined using $RGC(6; S(i))$. $V_x$ is the volume that each sampling point x is associated with. In particular embodiments, the weighting function may be truncated to only include sampling points 230 that contribute the most up to 95% of the Gaussian volume to reduce computational load. Each type of pooling unit 240 may use a different sampling point set and spacing function. FIG. 6 illustrates an example grouping of sampling points for a pooling unit based on a Gaussian weighting function. In the example illustrated in FIG. 6, sampling points 230 are depicted as dots. Polygons indicate volume that each sampling point 230 represents. Brightness indicates strength of contribution to the pooling unit 240 indicated by the X, which exists in the center. Although this disclosure describes grouping one or more sampling points for a pooling unit in a particular manner, this disclosure contemplates grouping one or more sampling points for a pooling unit in any suitable manner.

In particular embodiments, the computing device may compute a perception profile 205 for the source image 203 based on the weighted aggregations associated with each of the pooling units 240. The weighted aggregations associated with a pooling unit 240 may comprise a weighted aggregation of the sampled color information associated with the center receptive field and a weighted aggregation of the sampled color information associated with the surround receptive field. In particular embodiments, the computing device may compute the perception profile 205 for the source image 203 using ReLU activation functions. The perception profile 205 may comprise Midget-On response outputs, Midget-Off response outputs, Parasol-On response outputs, Parasol-Off response outputs, and SBC-On response Outputs. The Midget-On response output may be defined as Midget_On($i$)=ReLU(RGC(1,$S_{midget}(i)$)−RGC(6, $S_{midget}(i)$))

The Midget-Off response output may be defined as $$\text{Midget\_Off}(i) = \text{ReLU}(-\text{RGC}(1, S_{midget}(i)) + \text{RGC}(6, S_{midget}(i)))$$

where $S_{midget}(i)$ denotes the spacing function for a pooling unit 240 associated with Midget cells at a location i. The Parasol-On response output may be defined as $$\text{Parasol\_On}(i) = \text{ReLU}(\text{RGC}(1, S_{parasol}(i)) - \text{RGC}(6, S_{parasol}(i)))$$

The Parasol-Off response output may be defined as $$\text{Parasol\_Off}(i) = \text{ReLU}(-\text{RGC}(1, S_{parasol}(i)) + \text{RGC}(6, S_{parasol}(i)))$$

where $S_{parasol}(i)$ denotes the spacing function for a pooling unit 240 associated with Parasol cells at a location i. The SBC-On response output may be defined as $$\text{SBC\_On}(i) = \text{ReLU}(\text{RGC}(1, S_{sbc}(i)) - \text{RGC}(6, S_{sbc}(i)))$$

Although this disclosure describes computing a perception profile for a source image at the pooling units in a particular manner, this disclosure contemplates computing a perception profile for a source image at the pooling units in any suitable manner.

In particular embodiments, the computing device may model temporal responses of the retina. The retina is assumed to behave as a linear system. With an assumption that space and time in the retina are separable, modeling time components separate from the spatial components may become possible. Physiological studies show that Midget cells model sustained temporal responses, and Parasol cells model transient temporal responses. The temporal impulse response functions for each RGC type may be modeled simultaneously in the virtual eye model 200. For a given set of pooling units 240, the computing device may minimize a function that takes spatial response outputs of pooling units 240 and convolve them with temporal kernels.

$$\underset{\alpha, \beta, \ldots}{\text{argmin}} f\left(\sum_{i}^{N} \alpha_{N-i-1} a_i, \sum_{i}^{N} \beta_{N-i-1} b_i, \ldots\right) +$$

$$\lambda_1 \left|\sum_{i}^{N} \alpha_{N-i-1} a_i\right| + \lambda_2 \left|\sum_{i}^{N} \beta_{N-i-1} b_i\right| \ldots ,$$

where $\alpha_i, \beta_i, \ldots \exists_i \in \{0, \ldots, N-1\}$ are sets of weights corresponding to the linear temporal impulse functions of each pooling unit 240 type denoted by $a_i, b_i, \ldots$ The function $f$ applies the ReLU non-linearity followed by a network that combines spatiotemporal responses, and $\lambda_1, \lambda_2, \ldots$ are hyperparameters applied to tradeoff reconstruction with firing rate. The function $f$ takes the temporal convolution of response outputs of pooling units 240 as input, using them to predict the cone responses. In particular embodiments, the computing device may add zero-mean Gaussian noise with a small standard deviation to the color information sampled at the sampling points 230 before calculating the weighted aggregations of the sampled color information. In particular embodiments, the standard deviation may be 0.25. The computing device may include two sources of noise to account for cone uncertainty as well spiking noise. The computing device may apply Long Short-Term Memory (LSTM) for reconstruction of the cone responses, which may reconstruct spatiotemporal cone signals based on accumulated state, which is closer to how the brain receives the time-varying signal from the eye. Although this disclosure describes modeling temporal responses of the retina in a particular manner, this disclosure contemplates modeling temporal responses of the retina in any suitable manner.

Figure 7:
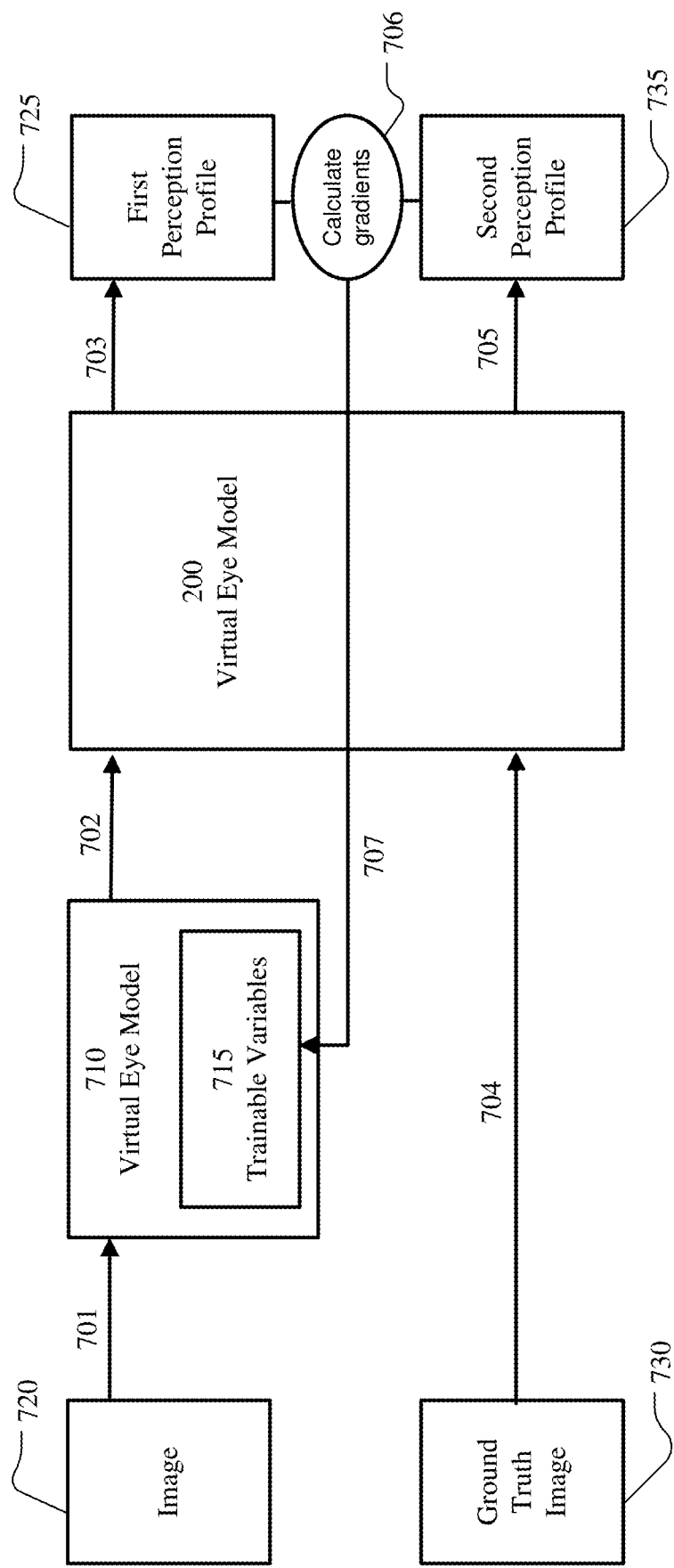
FIG. 7 illustrates an exampling training process of a machine-learning model using the virtual eye model.

In particular embodiments, the virtual eye model 200 may be used for training a machine-learning model that may be related to the visual perception. FIG. 7 illustrates an exampling training process of a machine-learning model using the virtual eye model 200. At step 701, the computing device may provide an image 720 to a machine-learning model 710, which will produce an output image based on the image 720. The computing device may access the output image of the machine-learning model as a first source image. At step 702, the computing device may provide the first source image to the virtual eye model 210. At step 703, the computing device may compute a first perception profile 725 for the first source image by processing the first source image with the virtual eye model 200. The computing device may access a ground truth image 730 corresponding to the first source image as a second source image. At step 704, the computing device may provide the second source image 730 to the virtual eye model 200 as an input. At step 705, the computing device may compute a second perception profile 735 for the second source image 730 by processing the second source image 730 with the virtual eye model 200. At step 706, the computing device may measure differences between the first perception profile 725 and the second perception profile 735. The computing device may compute gradients of trainable variables 715 of the machine-learning model 710 based on the measured differences. The computing device may be able to compute the gradients because variables in the virtual eye model are fully differentiable. At step 707. the computing device may update the trainable variables 715 of the machine-learning model by performing a gradient-descent backpropagation procedure with the computed gradients. In particular embodiments, the machine-learning model may be a foveated-rendering machine-learning model. In particular embodiments, the machine-learning model may be a metamers-generating machine-learning model. Although this disclosure describes training a machine-learning model using the virtual eye model in a particular manner, this disclosure contemplates training a machine-learning model using the virtual eye model in any suitable manner.

Figure 8:
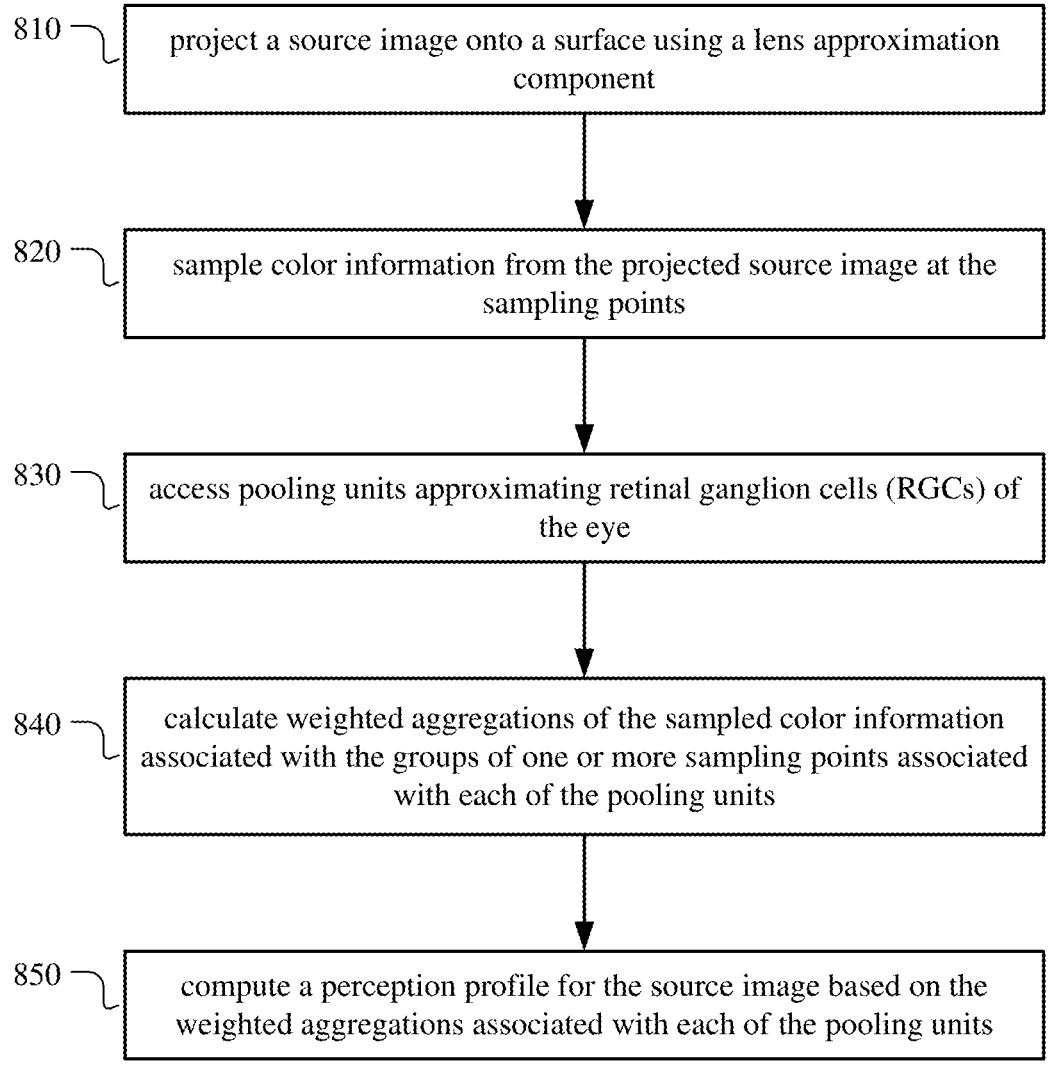
FIG. 8 illustrates an example method for computing a perception profile for a source image using a virtual eye model.

FIG. 8 illustrates an example method 800 for computing a perception profile for a source image using a virtual eye model. The method may begin at step 810, where the computing device may project a source image onto a surface using a lens approximation component. The surface may be associated with sampling points approximating photoreceptors of an eye. Each sampling point may have a corresponding photoreceptor type. At step 820, the computing device may sample color information from the projected source image at the sampling points. The color information sampled at each sampling point may depend on the corresponding photoreceptor type. At step 830, the computing device may access pooling units approximating retinal ganglion cells (RGCs) of the eye Each pooling unit may be associated with groups of one or more of the sampling points. At step 840, the computing device may calculate, for each of the pooling units, weighted aggregations of the sampled color information associated with the groups of one or more sampling points associated with that pooling unit. At step 850, the computing device may compute a perception profile for the source image based on the weighted aggregations associated with each of the pooling units. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for computing a perception profile for a source image using a virtual eye model including the particular steps of the method of FIG. 8, this disclosure contemplates any suitable method for computing a perception profile for a source image using a virtual eye model including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
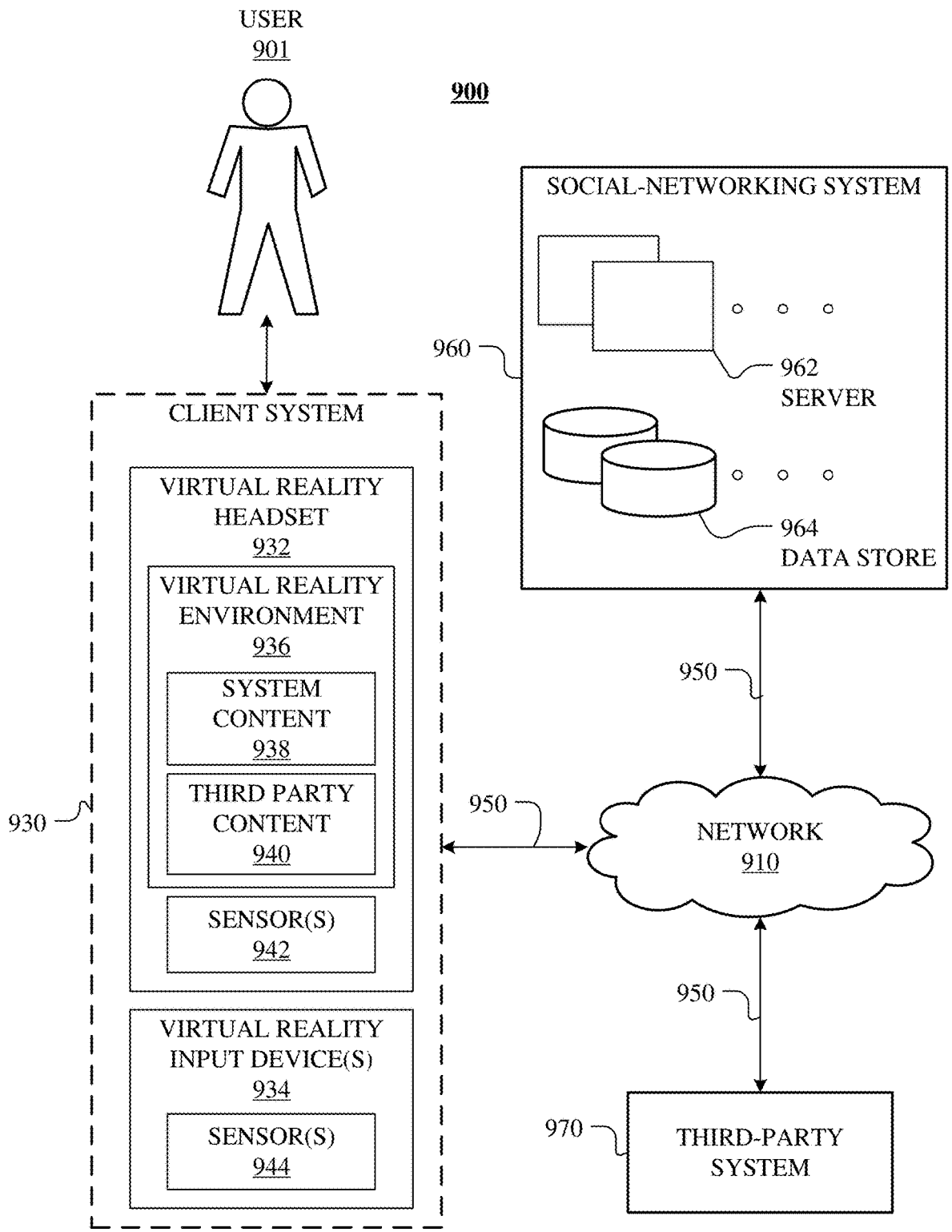
FIG. 9 illustrates an example network environment associated with a virtual reality system.

FIG. 9 illustrates an example network environment 900 associated with a virtual reality system. Network environment 900 includes a user 901 interacting with a client system 930, a social-networking system 960, and a third-party system 970 connected to each other by a network 910. Although FIG. 9 illustrates a particular arrangement of a user 901, a client system 930, a social-networking system 960, a third-party system 970, and a network 910, this disclosure contemplates any suitable arrangement of a user 901, a client system 930, a social-networking system 960, a third-party system 970, and a network 910. As an example and not by way of limitation, two or more of a user 901, a client system 930, a social-networking system 960, and a third-party system 970 may be connected to each other directly, bypassing a network 910. As another example, two or more of a client system 930, a social-networking system 960, and a third-party system 970 may be physically or logically co-located with each other in whole or in part. Moreover, although FIG. 9 illustrates a particular number of users 901, client systems 930, social-networking systems 960, third-party systems 970, and networks 910, this disclosure contemplates any suitable number of client systems 930, social-networking systems 960, third-party systems 970, and networks 910. As an example and not by way of limitation, network environment 900 may include multiple users 901, client systems 930, social-networking systems 960, third-party systems 970, and networks 910.

This disclosure contemplates any suitable network 910. As an example and not by way of limitation, one or more portions of a network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 910 may include one or more networks 910.

Links 950 may connect a client system 930, a social-networking system 960, and a third-party system 970 to a communication network 910 or to each other. This disclosure contemplates any suitable links 950. In particular embodiments, one or more links 950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout a network environment 900. One or more first links 950 may differ in one or more respects from one or more second links 950.

In particular embodiments, a client system 930 may be an electronic device including hardware, software, or embedded logic components or a combination of two or more such components and capable of carrying out the appropriate functionalities implemented or supported by a client system 930. As an example and not by way of limitation, a client system 930 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 930. A client system 930 may enable a network user at a client system 930 to access a network 910. A client system 930 may enable its user to communicate with other users at other client systems 930. A client system 930 may generate a virtual reality environment for a user to interact with content.

In particular embodiments, a client system 930 may include a virtual reality (or augmented reality) headset 932, such as OCULUS RIFT and the like, and virtual reality input device(s) 934, such as a virtual reality controller. A user at a client system 930 may wear the virtual reality headset 932 and use the virtual reality input device(s) to interact with a virtual reality environment 936 generated by the virtual reality headset 932. Although not shown, a client system 930 may also include a separate processing computer and/or any other component of a virtual reality system. A virtual reality headset 932 may generate a virtual reality environment 936, which may include system content 938 (including but not limited to the operating system), such as software or firmware updates and also include third-party content 940, such as content from applications or dynamically downloaded from the Internet (e.g., web page content). A virtual reality headset 932 may include sensor(s) 942, such as accelerometers, gyroscopes, magnetometers to generate sensor data that tracks the location of the headset device 932. The headset 932 may also include eye trackers for tracking the position of the user's eyes or their viewing directions. The client system may use data from the sensor(s) 942 to determine velocity, orientation, and gravitation forces with respect to the headset. Virtual reality input device(s) 934 may include sensor(s) 944, such as accelerometers, gyroscopes, magnetometers, and touch sensors to generate sensor data that tracks the location of the input device 934 and the positions of the user's fingers. The client system 930 may make use of outside-in tracking, in which a tracking camera (not shown) is placed external to the virtual reality headset 932 and within the line of sight of the virtual reality headset 932. In outside-in tracking, the tracking camera may track the location of the virtual reality headset 932 (e.g., by tracking one or more infrared LED markers on the virtual reality headset 932). Alternatively or additionally, the client system 930 may make use of inside-out tracking, in which a tracking camera (not shown) may be placed on or within the virtual reality headset 932 itself. In inside-out tracking, the tracking camera may capture images around it in the real world and may use the changing perspectives of the real world to determine its own position in space.

Third-party content 940 may include a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at a client system 930 may enter a Uniform Resource Locator (URL) or other address directing a web browser to a particular server (such as server 962, or a server associated with a third-party system 970), and the web browser may generate a Hyper Text Transfer Protocol (HTTP) request and communicate the HTTP request to server. The server may accept the HTTP request and communicate to a client system 930 one or more Hyper Text Markup Language (HTML) files responsive to the HTTP request. The client system 930 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 960 may be a network-addressable computing system that can host an online social network. The social-networking system 960 may generate, store, receive, and send social-networking data, such as, for example, user-profile data, concept-profile data, social-graph information, or other suitable data related to the online social network. The social-networking system 960 may be accessed by the other components of network environment 900 either directly or via a network 910. As an example and not by way of limitation, a client system 930 may access the social-networking system 960 using a web browser of a third-party content 940, or a native application associated with the social-networking system 960 (e.g., a mobile social-networking application, a messaging application, another suitable application, or any combination thereof) either directly or via a network 910. In particular embodiments, the social-networking system 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 962 may include hardware, software, or embedded logic components or a combination of two or more such components for carrying out the appropriate functionalities implemented or supported by server 962. In particular embodiments, the social-networking system 960 may include one or more data stores 964. Data stores 964 may be used to store various types of information. In particular embodiments, the information stored in data stores 964 may be organized according to specific data structures. In particular embodiments, each data store 964 may be a relational, columnar, correlation, or other suitable database. Although this disclosure describes or illustrates particular types of databases, this disclosure contemplates any suitable types of databases. Particular embodiments may provide interfaces that enable a client system 930, a social-networking system 960, or a third-party system 970 to manage, retrieve, modify, add, or delete, the information stored in data store 964.

In particular embodiments, the social-networking system 960 may store one or more social graphs in one or more data stores 964. In particular embodiments, a social graph may include multiple nodes—which may include multiple user nodes (each corresponding to a particular user) or multiple concept nodes (each corresponding to a particular concept)—and multiple edges connecting the nodes. The social-networking system 960 may provide users of the online social network the ability to communicate and interact with other users. In particular embodiments, users may join the online social network via the social-networking system 960 and then add connections (e.g., relationships) to a number of other users of the social-networking system 960 whom they want to be connected to. Herein, the term "friend" may refer to any other user of the social-networking system 960 with whom a user has formed a connection, association, or relationship via the social-networking system 960.

In particular embodiments, the social-networking system 960 may provide users with the ability to take actions on various types of items or objects, supported by the social-networking system 960. As an example and not by way of limitation, the items and objects may include groups or social networks to which users of the social-networking system 960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 960 or by an external system of a third-party system 970, which is separate from the social-networking system 960 and coupled to the social-networking system 960 via a network 910.

In particular embodiments, the social-networking system 960 may be capable of linking a variety of entities. As an example and not by way of limitation, the social-networking system 960 may enable users to interact with each other as well as receive content from third-party systems 970 or other entities, or to allow users to interact with these entities through an application programming interfaces (API) or other communication channels.

In particular embodiments, a third-party system 970 may include one or more types of servers, one or more data stores, one or more interfaces, including but not limited to APIs, one or more web services, one or more content sources, one or more networks, or any other suitable components, e.g., that servers may communicate with. A third-party system 970 may be operated by a different entity from an entity operating the social-networking system 960. In particular embodiments, however, the social-networking system 960 and third-party systems 970 may operate in conjunction with each other to provide social-networking services to users of the social-networking system 960 or third-party systems 970. In this sense, the social-networking system 960 may provide a platform, or backbone, which other systems, such as third-party systems 970, may use to provide social-networking services and functionality to users across the Internet.

In particular embodiments, a third-party system 970 may include a third-party content object provider. A third-party content object provider may include one or more sources of content objects, which may be communicated to a client system 930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 960 also includes user-generated content objects, which may enhance a user's interactions with the social-networking system 960. User-generated content may include anything a user can add, upload, send, or "post" to the social-networking system 960. As an example and not by way of limitation, a user communicates posts to the social-networking system 960 from a client system 930. Posts may include data such as status updates or other textual data, location information, photos, videos, links, music or other similar data or media. Content may also be added to the social-networking system 960 by a third-party through a "communication channel," such as a newsfeed or stream.

In particular embodiments, the social-networking system 960 may include a variety of servers, sub-systems, programs, modules, logs, and data stores. In particular embodiments, the social-networking system 960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 960 may also include suitable components such as network interfaces, security mechanisms, load balancers, failover servers, management-and-network-operations consoles, other suitable components, or any suitable combination thereof. In particular embodiments, the social-networking system 960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 960 to one or more client systems 930 or one or more third-party systems 970 via a network 910. The web server may include a mail server or other messaging functionality for receiving and routing messages between the social-networking system 960 and one or more client systems 930. An API-request server may allow a third-party system 970 to access information from the social-networking system 960 by calling one or more APIs. An action logger may be used to receive communications from a web server about a user's actions on or off the social-networking system 960. In conjunction with the action log, a third-party-content-object log may be maintained of user exposures to third-party-content objects. A notification controller may provide information regarding content objects to a client system 930. Information may be pushed to a client system 930 as notifications, or information may be pulled from a client system 930 responsive to a request received from a client system 930. Authorization servers may be used to enforce one or more privacy settings of the users of the social-networking system 960. A privacy setting of a user determines how particular information associated with a user can be shared. The authorization server may allow users to opt in to or opt out of having their actions logged by the social-networking system 960 or shared with other systems (e.g., a third-party system 970), such as, for example, by setting appropriate privacy settings. Third-party-content-object stores may be used to store content objects received from third parties, such as a third-party system 970. Location stores may be used for storing location information received from client systems 930 associated with users. Advertisement-pricing modules may combine social information, the current time, location information, or other suitable information to provide relevant advertisements, in the form of notifications, to a user.

Figure 10:
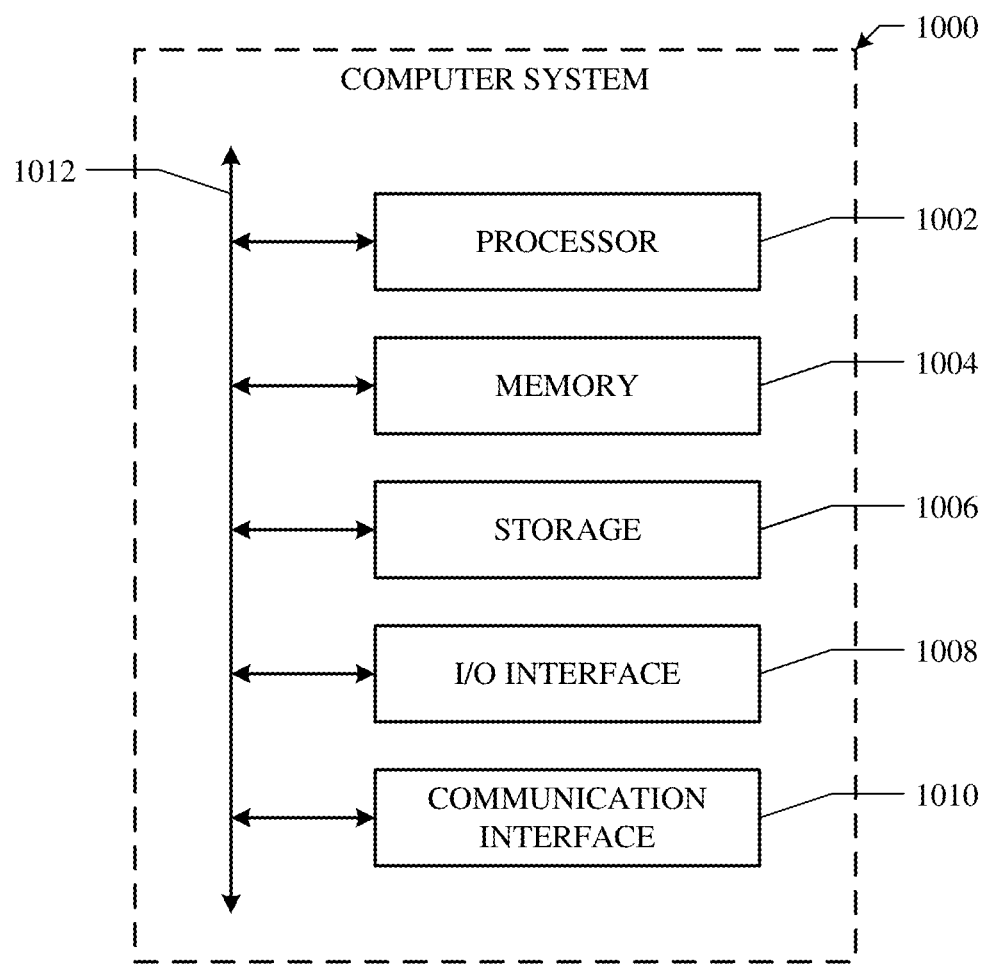
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

REFERENCES

[1] Cottaris, Nicolas P., et al. "A computational-observer model of spatial contrast sensitivity: Effects of wavefront-based optics, cone-mosaic structure, and inference engine." Journal of vision 19.4 (2019): 8-8.
[2] https://github.com/isetbio/isetbio/wiki
[3] C. A. Curcio, K. R. Sloan, R. E. Kalina, and A. E. Hendrickson, "Human photoreceptor topography," Journal of comparative neurology, vol. 292, no. 4, pp. 497-523, 1990.
[4] A. B. Watson, "A formula for human retinal ganglion cell receptive field density as a function of visual field location," Journal of Vision, vol. 14, no. 7, pp. 15-15, 2014.
[5] D. M. Dacey and M. R. Petersen, "Dendritic field size and morphology of midget and parasol ganglion cells of the human retina," Proceedings of the National Academy of sciences, vol. 89, no. 20, pp. 9666-9670, 1992.

What is claimed is:
1. A method comprising:
projecting a source image onto a surface using a lens approximation component, wherein the surface is associated with sampling points approximating photoreceptors of an eye, wherein each sampling point has a corresponding photoreceptor type, and wherein the lens approximation component projects the source image onto a curved shape surface and maps the source image projected onto the curved shape surface into an image on the surface;
sampling color information from the projected source image at the sampling points, wherein the color information sampled at each sampling point depends on the corresponding photoreceptor type;

accessing pooling units approximating retinal ganglion cells (RGCs) of the eye, wherein each pooling unit is associated with groups of one or more of the sampling points;

calculating, for each of the pooling units, weighted aggregations of the sampled color information associated with the groups of one or more sampling points associated with that pooling unit; and computing a perception profile for the source image based on the weighted aggregations associated with each of the pooling units.

2. The method of claim 1, wherein the surface approximates a retina of the eye.

3. The method of claim 2, wherein the lens approximation component comprises an Optical Transfer Function (OTF) and a warping operator, wherein the OTF convolves a matrix representing pixel information of the source image with convolution templates and multiplies with a coding matrix, wherein the convolution templates and the coding matrix are obtained by a matrix factorization, and wherein the warping operator maps an image on a concave shape of the retina to an image in the surface.

4. The method of claim 1, wherein a distribution of a type of the sampling points is associated with a corresponding blue noise mask.

5. The method of claim 1, wherein each pooling unit has a corresponding RGC type.

6. The method of claim 5, wherein a distribution of a type of the pooling units is associated with a corresponding blue noise mask.

7. The method of claim 1, wherein a group of one or more of the sampling points associated with a pooling unit is determined based on a field weighting function.

8. The method of claim 7, wherein the field weighting function is a Gaussian receptive field function.

9. The method of claim 1, wherein the source image corresponds to a frame of a video stream.

10. The method of claim 1, wherein the source image can be of any resolution, and wherein a resolution of the surface is pre-determined.

11. The method of claim 1, wherein the perception profile for the source image is computed using Rectified Linear Unit (ReLU) activation functions.

12. The method of claim 1, further comprising:
accessing an output image of a machine-learning model as a first source image;
computing a first perception profile for the first source image;
accessing a ground truth image corresponding to the output image of the machine-learning model as a second source image;
computing a second perception profile for the second source image;
measuring differences between the first perception profile and the second perception profile; and
updating trainable variables of the machine-learning model by performing a gradient-descent backpropagation procedure with gradients computed based on the measured differences.

13. The method of claim 12, wherein the machine-learning model is a foveated-rendering machine-learning model.

14. The method of claim 12, wherein the machine-learning model is a metamers-generating machine-learning model.

15. One or more computer-readable non-transitory storage media embodying software that is operable when executed to:
project a source image onto a surface using a lens approximation component, wherein the surface is associated with sampling points approximating photoreceptors of an eye, wherein each sampling point has a corresponding photoreceptor type, and wherein the lens approximation component projects the source image onto a curved shape surface and maps the source image projected onto the curved shape surface into an image on the surface;
sample color information from the projected source image at the sampling points, wherein the color information sampled at each sampling point depends on the corresponding photoreceptor type;
access pooling units approximating retinal ganglion cells (RGCs) of the eye, wherein each pooling unit is associated with groups of one or more of the sampling points;
calculate, for each of the pooling units, weighted aggregations of the sampled color information associated with the groups of one or more sampling points associated with that pooling unit; and
compute a perception profile for the source image based on the weighted aggregations associated with each of the pooling units.

16. The media of claim 15, wherein the surface approximates a retina of the eye.

17. The media of claim 16, wherein the lens approximation component comprises an Optical Transfer Function (OTF) and a warping operator, wherein the OTF convolves a matrix representing pixel information of the source image with convolution templates and multiplies with a coding matrix, wherein the convolution templates and the coding matrix are obtained by a matrix factorization, and wherein the warping operator maps an image on a concave shape of the retina to an image in the surface.

18. The media of claim 15, wherein a distribution of a type of the sampling points is associated with a corresponding blue noise mask.

19. The media of claim 15, wherein each pooling unit has a corresponding RGC type.

20. A system comprising: one or more processors; and a non-transitory memory coupled to the processors comprising instructions executable by the processors, the processors operable when executing the instructions to:
project a source image onto a surface using a lens approximation component, wherein the surface is associated with sampling points approximating photoreceptors of an eye, wherein each sampling point has a corresponding photoreceptor type, and wherein the lens approximation component projects the source image onto a curved shape surface and maps the source image projected onto the curved shape surface into an image on the surface;
sample color information from the projected source image at the sampling points, wherein the color information sampled at each sampling point depends on the corresponding photoreceptor type;
access pooling units approximating retinal ganglion cells (RGCs) of the eye, wherein each pooling unit is associated with groups of one or more of the sampling points;
calculate, for each of the pooling units, weighted aggregations of the sampled color information associated with the groups of one or more sampling points associated with that pooling unit; and compute a perception profile for the source image based on the weighted aggregations associated with each of the pooling units.

\* \* \* \* \*